United States Patent [19]
Ellis et al.

[11] Patent Number: 5,171,404
[45] Date of Patent: Dec. 15, 1992

[54] METHOD AND APPARATUS FOR CALENDERING PAPER WITH INTERNALLY HEATED ROLL

[75] Inventors: Eric R. Ellis, Westbrook, Me.; Fred J. Ferrari, Springfield, Pa.; Gregory H. Hale, Waterville, Me.; Joyce M. Harrington, Gray, Me.; Kenneth B. Jewett, Portland, Me.; John A. Mattor, Bar Mills, Me.; Abbott W. Mosher, Gorham, Me.; John O. H. Peterson, Standish, Me.; Douglas A. Quist, Kennebunk, Me.

[73] Assignee: S. D. Warren Company, Philadelphia, Pa.

[21] Appl. No.: 620,249

[22] Filed: Nov. 30, 1990

[51] Int. Cl.⁵ .......................... D21G 1/00; D21G 3/02
[52] U.S. Cl. ...................................... 162/206; 29/130; 29/132; 100/38; 100/93 RP; 162/290; 165/90
[58] Field of Search ............... 162/206, 207, 290, 359, 162/361; 100/38, 93 RP; 29/132, 130; 165/89, 90

[56] References Cited

U.S. PATENT DOCUMENTS

| | | | |
|---|---|---|---|
| 4,506,727 | 3/1985 | Swasey | 165/90 |
| 4,704,776 | 11/1987 | Watanabe et al. | 29/132 |
| 4,796,342 | 1/1989 | Miihkiner | 29/132 |
| 4,856,161 | 8/1989 | Miihkiner | 29/132 |
| 4,912,835 | 4/1990 | Harada et al. | 29/132 |
| 4,948,466 | 8/1990 | Jaakkola | 162/206 |
| 4,955,433 | 9/1990 | Zaoralek | 165/90 |

FOREIGN PATENT DOCUMENTS

| | | | |
|---|---|---|---|
| 2136421 | 6/1987 | Japan | 29/132 |
| 1150677 | 6/1989 | Japan | |

*Primary Examiner*—Karen M. Hastings
*Attorney, Agent, or Firm*—R. Duke Vickrey; J. W. Kane, Jr.; F. M. DiBiase

[57] ABSTRACT

Disclosed is a new internally heated calendering roll capable of finishing paper satisfactorily at the temperatures, heat loads and pressures required for substrata thermal molding. The roll is internally heated and has a circumferential wall at least 4 inches thick. It includes means to provide heat into the interior of the circumferential wall to be conducted through the wall to the outer surface for heating the paper web being calendered by the roll. The roll is constructed of a first material with a thin circumferential surface layer of a second, cermet or ceramic containing material. The surface layer material has a hardness of at least 530 Vickers and a thickness of between 0.003 inch and 0.030 inches. It is capable of being polished to a roughness of less than 6 micro inches Ra. The roll has uniformly spaced conduits for passing heated fluid located no more than 2 inches from the outer edge of the conduits to the circumferential surface. The roll is capable of conducting at least 8,500 BTU/Sq. Ft./Hr. heat through the roll without creating tensile hoop stress in excess of ½ of the yield strength of the first material.

13 Claims, 3 Drawing Sheets

METHOD AND APPARATUS FOR CALENDERING PAPER WITH INTERNALLY HEATED ROLL

TECHNICAL FIELD

The invention relates generally to processes and equipment for the manufacture of printing paper, and in particular, to a heated calender roll for calendering printing paper at high temperature and pressure

BACKGROUND ART

One of the most important steps in the manufacture of high quality printing papers, coated or uncoated, is the calendering of the paper web to impart gloss and smoothness to its surface A number of different processes exist for calendering paper. One long used for producing the highest quality product is supercalendering. Gloss calendering is another process, which while not producing the quality of supercalendering, does have process advantages over supercalendering. Substrata thermal molding is a recently developed calendering process which combines process advantages of gloss calendering with the quality advantages of supercalendering.

Substrata thermal molding is described in U.S. Pat. Nos. 4,624,744 and 4,749,445, which patents are hereby incorporated by reference. It employs a calendering nip formed by a heated metal roll and a resilient pressure roll. The metal roll is heated to a temperature higher than that employed in gloss calendering equipment. The required temperature varies with changes in the process conditions, but it will typically be in excess of 300° F. on the surface of the metal roll. Very high nip pressure is also required, in excess of 2000 psi, which requires nip loads in excess of 1000 pli of calender width and typically between 1500 to 2000 pli.

The heated calendering roll for gloss calendering is typically a hollow thin walled metal cylinder or drum which is heated internally with steam at temperatures up to about 350° F. The drum is made from chilled iron, ductile iron or chrome plated ductile iron, which provides a hard, abrasion resistant surface which takes and holds a high polish. Chrome plated drums provide excellent polished surface, but are easily scratched in operation. The gloss calender drum has been found satisfactory for calendering at the moderate temperatures and pressures of gloss calendering, but not at the conditions necessary for substrata thermal molding. The calendering roll rigidity needed for the high nip loads of substrata thermal molding require rolls with much thicker circumferential walls, in excess of 4 inches thick. The higher temperature requirements of substrata thermal molding have placed additional requirements on the heated roll. Much hotter internal heating fluids are required. This has required the use of higher boiling point fluids, such as oils. The hotter internal fluid temperatures require placement of fluid conduits close to the surface of the roll to decrease the thermal heat flow resistance to the roll surface. The use of multiple nips on each heated roll, which is advantageous in practicing substrata thermal molding, further increases the thermal requirements. It has been found that a second nip can increase the heat load by about 30% over that required for a single nip.

One form of roll employed in substrata thermal molding is the Tri-Pass roll produced by SHW Corporation. The Tri-Pass roll is a chilled iron roll with a very thick cylinder wall, typically about 7 to 11 inches thick. Holes are drilled axially through the roll close to the surface to act as conduits for the heating fluid. Chilled iron rolls have an outer layer of hard white iron, an inner structure of cast gray iron, and an in between layer of mottled iron with properties between white iron and gray iron. The fluid holes are preferably drilled through the softer gray iron, so they are positioned as close to the interface of the mottled iron and the gray iron as possible. The thickness of the white iron is typically from $\frac{1}{4}$ inch to $\frac{3}{4}$ inch and the thickness of the mottled iron is typically from 1 inch to $1\frac{1}{2}$ inch. This places the holes about 2 inches from the surface. In addition to the disadvantage of requiring placement of the holes further from the surface, the mottled iron makes it difficult to drill the holes straight because of an irregular location of the interface.

The thermal conductivity of the white iron (13 BTU/Hr.Ft.°F.) and mottled iron (17 BTU/Hr.Ft.°F.) is lower than of the gray iron (25 BTU/Hr.Ft.°F.), providing an advantage and a disadvantage in conducting heat to the surface. Heat has to travel farther from the holes to the surface at points om the surface between the holes. The lower conductivity of the white iron and mottled iron moderates the variation in the surface temperature, which in turn provides more uniform finishing to the paper. However, the lower conductivity, coupled with the extreme thermal requirements of substrata thermal molding, creates a very large temperature drop from the heating fluid conduits to the surface of the drum. Drops of about 150° F. and higher can occur in commercial operations. The much higher temperature in the interior of the roll creates greater thermal expansion than the lower temperature on the surface, resulting in the creation of high tensile hoop stresses. The hoop stresses can be great enough to exceed the ultimate tensile strength of the chilled material and destroy the chilled iron roll. Only lower temperatures or slower operating speeds permit safe operations. The safe operation limit is below 7,000 BTU/Sq.Ft./Hr. heat flow through the rolls for chilled iron rolls. One solution for reducing the heat flow through the roll is to provide part or all of the required heat to the surface of the roll from external sources, such as induction heating the surface. Externally mounted devices, however, are not completely satisfactory. They are not energy efficient. They do not provide uniform surface temperature over the widths of commercial size rolls. They create impediments in the path of the paper web and additional operating problems. An internally heated roll would be more satisfactory if the hoop stresses can be kept to an acceptable level for the material chosen.

Substituting for chilled iron rolls is not easy. The advantageous properties of the white iron surface are not easy to find in other materials. The surface must be capable of developing a high polish. It must be sufficiently hard to resist deterioration of the polished surface when faced with abrasive paper coating materials, the abrasive action of a cleaning doctor blade, and a corrosive environment. It must have the surface characteristics necessary to release cleanly the paper and coating after calendering, such as an appropriate surface energy and polarity component.

DISCLOSURE OF THE INVENTION

The present invention is a new internally heated calendering roll capable of finishing paper satisfactorily at the temperatures, heat loads and pressures required for substrata thermal molding and at higher operating speeds than prior art apparatus. The roll is internally heated and has a circumferential wall at least 4 inches thick. It includes means to provide heat into the interior of the circumferential wall to be conducted through the wall to the outer surface for heating the paper web being calendered by the roll. The roll is constructed of a first material with a thin circumferential surface layer of a second, cermet or ceramic containing material. The surface layer material has a hardness of at least 530 Vickers and a thickness of between 0.003 inch and 0.030 inches. It is capable of being polished to a roughness of less than 6 micro inches Ra. The roll has uniformly spaced conduits equidistant from the center of the roll for passing heated fluid located no more than 2 inches from the outer edge of the conduits to the circumferential surface. The roll is capable of conducting at least 8,500 BTU/Sq. Ft./Hr. heat through the roll without creating tensile hoop stress in excess of $\frac{1}{2}$ of the yield strength of the first material.

The first material of the roll is preferably forged steel, cast steel, cast iron, or ductile iron, and more preferably forged steel. It is important that the material be uniform at least in the area where the fluid conduits are to be drilled. The surface material is preferably cermets or ceramics thermally sprayed or plasma applied. The preferred cermets are tungsten carbide and chromium carbide in a matrix of a more ductile material which may be selected from nickel, chromium, cobalt or combinations of these. The most preferable surface material is chromium carbide in a matrix of nickel and chromium. The preferred ceramic is chromium oxide.

The invention is also a new internally heated calendering roll capable of finishing paper satisfactorily at the temperatures and pressures required for substrata thermal molding in which the roll is provided by an internally heated, metal calendering roll having a circumferential wall at least 4 inches thick. The roll includes heating means to provide heat into the interior of the circumferential wall of the metal calendering roll to be conducted through the wall to the outer surface for heating the paper web being calendered by the roll. The heating means includes fluid conducting conduits in the calendering roll which are from 0.5 to 2 inches in diameter, and are positioned in accordance with the following formula: (hole diameter+hole spacing)/(2×hole depth) is less than 1.2, where hole spacing is the distance from outer edge of one hole to the closest outer edge of the adjacent hole and hole depth is the distance from the outer edge of the hole to the surface of the roll. The thermal conductivity of the roll from the conduits to the surface is greater than 17 BTU/Hr.Ft.°F.

The invention is also an improved calendering process and apparatus which employs any of the above described improved heated calendering rolls with a resilient pressure roll; means to press the resilient pressure roll and the metal calendering roll against each other to form a nip, preferably at a nip load in excess of 1000 pli of calendering width; and means to continuously pass a web of paper through the nip.

The invention is also an improvement to a calendering process and apparatus for providing a smooth surface to paper, which apparatus comprises:

A. a metal calendering roll;
B. a resilient pressure roll;
C. means to press the resilient pressure roll and the metal calendering roll against each other to form a nip;
D. means to continuously pass a web of paper through the nip; and
E. means to provide heat to the surface of the metal calendering roll. The improvement comprises a polishing doctor blade positioned against the circumferential surface of the metal calendering roll to resurface the roll while in operation faster than it deteriorates, the polishing doctor having a working surface containing an abrasive material harder than the surface material, preferably diamond abrasive particles. The doctor blade preferably comprises a thin structure of high glass transition temperature epoxy material with a working surface in contact with the metal surface. The working surface includes a layer of a composition extending across the width of the doctor blade, the composition comprising abrasive particles harder than the metal surface and in a matrix of high temperature epoxy.

The invention is also the polishing doctor blade described above for resurfacing the surface of a metal calendering roll while in operation.

The invention is also all combinations of the above described features.

BEST MODE FOR CARRYING OUT THE INVENTION

Figure 1:
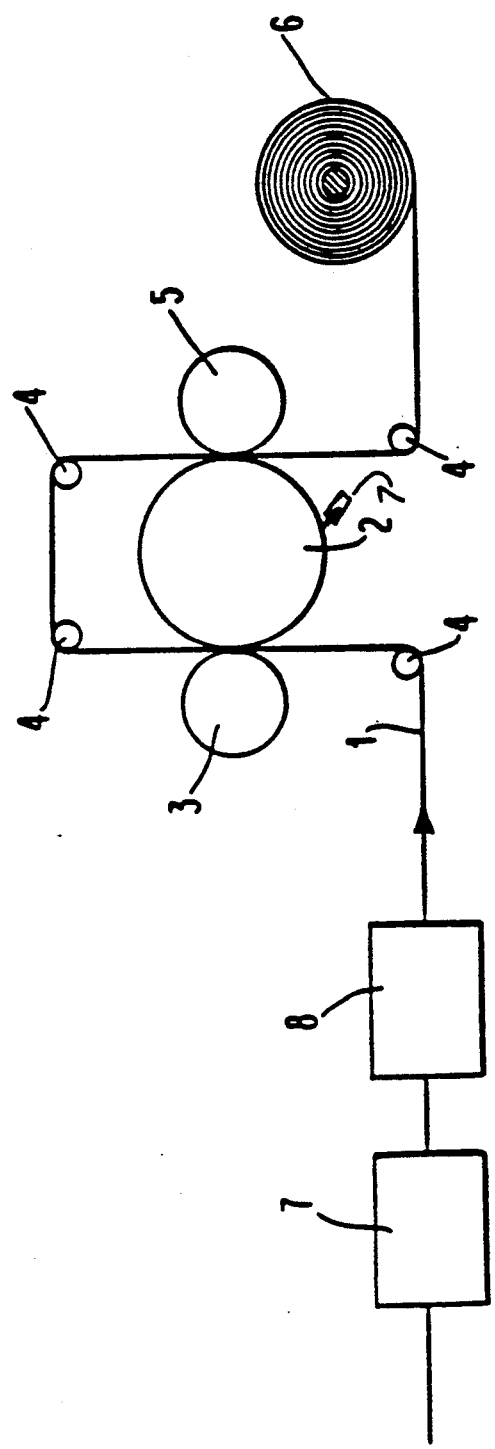
FIG. 1 illustrates schematically a substrata thermal molding apparatus employing the heated calendering roll of the present invention.

The present invention can be carried out on an apparatus like that illustrated in FIG. 1. A paper web 1 is advanced through the first nip formed by smooth surface finishing drum 2 and resilient backing roll 3, around guide rolls 4, and through an optional second nip formed by drum 2 and resilient backing roll 5. Thereafter, if desired to finish the other side of web 1, it is advanced to a second smooth surface finishing drum (not illustrated for simplicity) with a pair of nips formed by resilient backing rolls similar to the first unit. The finished web is then wound onto reel 6.

The web 1 supplied to the finishing apparatus can come directly from a papermaking machine 7 and/or coater 8 if the paper is to be coated. In the alternative, the web 1 can be supplied from a roll of previously manufactured paper which may or may not have already been coated. The papermaking machine and coater are illustrated only as blocks since they can be provided by any conventional apparatus well known in the art.

The resilient pressure rolls 3 and 5 must have a cover material of resilient or yieldable material, such as fiber reinforced epoxy resin. Preferred rolls are manufactured by the Beloit Corporation under the trademarks Beltex, Belgloss and Belsheen. The resilient pressure roll to practice substrata thermal molding must have sufficient hardness at operating temperatures to withstand a nip load force in excess of 1000 pounds per lineal inch of calender width and probably greater than 1500 pounds per lineal inch, while producing a nip width sufficiently small to provide a nip pressure in excess of 2000 pounds per square inch. It is preferable for the pressure roll surface to have a P. & J. hardness of about 4 or harder at operating temperatures to develop the desired nip width and pressure. To maintain this hardness may require internal cooling of the roll, since the typical resilient roll materials become soft very quickly at elevated temperatures. An example of a resilient roll which can perform satisfactorily in the invention is disclosed in U.S. Pat. No. 3,617,455.

Figure 2:
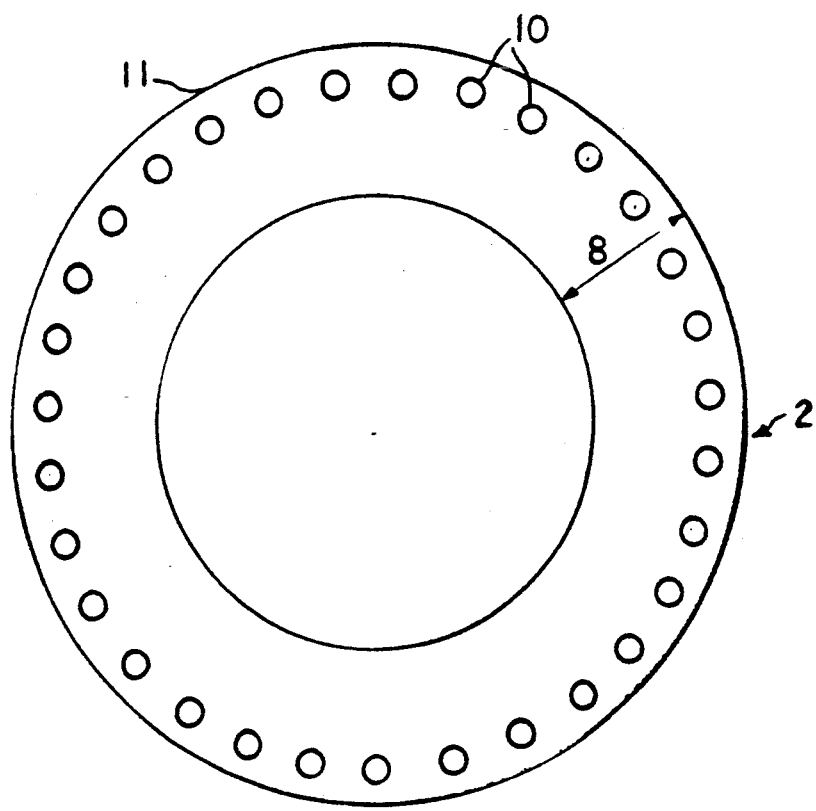
FIG. 2 illustrates in a sectional view the preferred form of the heated calendering roll of the present invention.

The heated calendering roll 2 of the invention is illustrated in greater detail in FIG. 2. The roll 2 is constructed from a metal cylinder with a circumferential wall 8 sufficiently thick to enable withstanding high nip loads with acceptable deflection in the center of the roll 2. The wall thickness will be at least 4 inches thick, and generally greater than 7 inches. Around the circumferential surface of the roll 2 is thin layer 11 of hard, abrasive resistant material.

Within the wall 8 are drilled a plurality of fluid carrying holes 10. The size, number and location of the holes are important to maximize heat transfer and temperature uniformity around the circumference of the roll 2. The closer the holes 11 are to the surface 12, the lower the temperature drop to the surface and the lower the tensile hoop stress generated. However, the further the holes 11 are from the surface 12, the more uniform the surface temperature will be. Also the smaller the holes 11 are and the closer they are together, the more uniform the surface temperature, but present practical drilling considerations will generally limit the holes size to greater than 0.8 inch. Moreover, surface temperature uniformity is also affected by the drop in temperature of the heating fluid as it passes through each conduit. The larger the conduit, the less the temperature drop.

The preferred design is provided by holes having a diameter of from 0.75 inch to 1.25 inches in diameter. In order to provide a high heat flux without creating too high a temperature drop of the oil passing through each hole, a minimum oil flow is required. This flow can only be obtained with a minimum cross section of conduit per surface area of the roll. This relationship is expressed as (cross section area of each conduit × the number of conduits)/(circumference of roll × face length of roll) is greater than 0.00013.

The holes are preferably positioned in accordance with the following formula: (hole diameter + hole spacing)/(2 × hole depth) is less than 1.2, where hole spacing is the distance from outer edge of one hole to the closest outer edge of the adjacent hole and hole depth is the distance from the outer edge of the hole to the surface of the roll. This arrangement is designed to provide the best surface temperature uniformity within the other practical limitations.

The roll 2 is preferably manufactured from forged steel to provide maximum strength. However, it can also be made from cast iron, cast steel or ductile iron, but with lower operating capacity. The roll 2 is preferably made from a uniform material with a thermal conductivity no less than 17 BTU/Hr.Ft.°F. The required properties for the surface layer 11 are provided by applying a layer of hard material preferably between 0.003 inch and 0.030 inch thick. Because of the thinness of the surface layer, its thermal conductivity is not very important. On the other hand this thickness will provide a reasonable life for the layer.

The surface material is preferably provided by tungsten carbide or chromium carbide. The surface material is preferably applied to the roll surface in a thermal spray sufficiently hot to bond the particles together and with sufficient velocity to produce a porosity of less than 5%. The preferred application method is high velocity oxy-fuel.

The preferred form of surface composite is provided by a prealloyed powder consisting of 75% chromium carbide and 25% nickel chromium. It is believed that ratios of 70% to 80% chromium carbide, 15% to 25% nickel and 3% to 10% chromium will work satisfactorily.

In a relatively short period of time commercial usage of metal calendering rolls will result in a hazing of the surface due to some combination of surface deterioration causes. The period of time is greater for the preferred embodiment than for others tested. To restore the surface, the surface must be polished at intervals depending upon the durability of the material. Polishing can be carried out while the heated roll is in operation by doctor blade 7 positioned against the roll 2 in FIG. 1.

Figure 3:
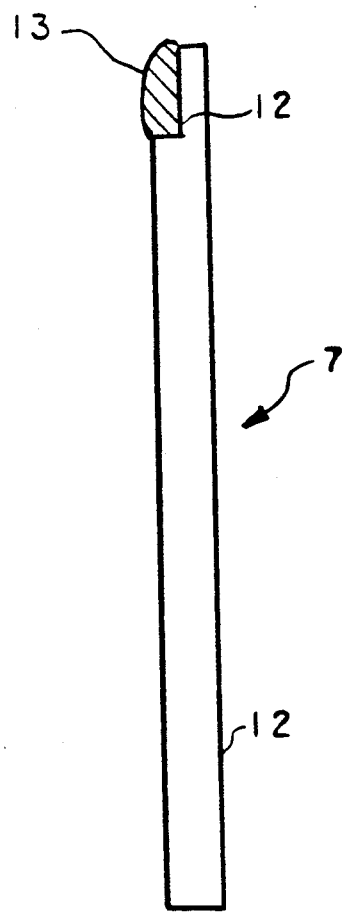
FIG. 3 illustrates in a sectional view the preferred form of polishing doctor of the present invention.

The preferred form of doctor blade 7 is disclosed in more detail in FIG. 3. It consists of a wide glass fiber reinforced epoxy material 12 with a layer 13 of abrasive composition at the working edge of the blade 7. The layer is preferably placed in a notch 12 of the blade 7 and is thick enough to extend at least even or beyond the blade 7 to assure contact with the roll surface 11. The preferred form of doctor blade 7 of the invention will polish the roll surface of very hard materials and will withstand continuous use at very high roll surface temperatures.

The preferred polishing composition is:
Diamond abrasive particles, 3 microns dia. 2.5% by weight
Epoxy with hardener 52.5% by weight
Hollow glass microspheres, (3M S-60/10,000) 30% by weight
Teflon (polytetrafluoroethylene) powder (Diamond Shamrock SST-3) 15% by weight The abrasive composition was spread into a notch in the epoxy blade and heated to 60° C. to 70° C. until set. It was then heated at 120° C. for 4 hours. The epoxy used was diglycidyl ether of bispheno A with a hardener of methylene dianiture with a Tg of 160° C. to 180° C. The ratio of abrasive particles is believed to be satisfactory from about 1% to about 5% of the composition. The size of the particles can be varied somewhat, but is preferably between 2 and 12 microns. The epoxy employed for making the base blade is the same as that used for the abrasive composition, but in the blade it is reinforced with fiberglass woven mats. The surface of abrasive composition after curing was milled smooth down to a thickness of about 25 mils.

The polishing doctor does not have to be in constant contact with the roll surface, but should be pressed against the roll for about 10% of the time.

The following is an example of the best mode of invention. A high velocity oxy-fuel thermal flame spraying technique was used to apply the surface layer on a roll of forged steel in a coating thickness of about 0.015 inch. The composition applied was a pre alloyed powder consisting of 25% nickel chromium and 75% chromium carbide. The ratio of the NiCr was 80% Ni and 20% Cr. The roll surface exhibited a hardness of 950 Vickers. It was polished to a roughness of 2-4 micro inches Ra.

The roll was drilled with holes of 1.18 inch in diameter spaced 1.16 inch apart and an average of 1.75 inch from the surface.

The roll was mounted in a calendering apparatus similar to that illustrated in FIG. 1. Oil heated externally of the roll to a temperature ranging up to 500° F. was circulated through the holes in alternating directions at adjacent holes. Paper webs having conventional pigment and binder coatings suitable for printing and containing about 4–5% moisture were calendered in the apparatus under conditions necessary for substrata thermal molding. The calender was operated at speeds of from 1700 to 3100 fpm and nip loads of from 1800 to 2000 pli.

The surface temperature of the roll was found to be about 100° F. less than the internal temperature. The temperature around the roll was found sufficiently uniform to provide variation in gloss of less than 2 points.

A polishing doctor of the preferred form described above was pressed against the surface of the roll at a pressure of 1 pli and at an angle of 25° to the tangent of the roll. The roll ran cleanly over a prolonged period of time and produced coated paper of desired gloss and smoothness. In another test without the polishing doctor the roll ran cleanly without excessive surface deterioration for several days, but for long term operation required the polishing doctor. This preferred embodiment performed superior to other embodiments of the invention in this respect.

What is claimed is:

1. In a process for finishing paper to produce gloss and smoothness on the surface of the paper comprising the steps of:
    A. providing a finishing apparatus comprising a finishing roll and a pressure roll pressed against said finishing roll at a force of at least 1000 pounds per lineal inch of calender width;
    B. advancing a web of papermaking fibers through the nip; and
    C. simultaneously with step B., heating the finishing roll to an internal temperature of at least 350° F. in the interior of the circumferential wall of the finishing roll to be conducted through the wall to the outer surface for heating the paper web passing through the nip,
    the improvement wherein the finishing roll is constructed of a first uniform material with a thin circumferential surface layer of a cermet or ceramic containing material having a hardness of at least 530 Vickers hardness and a thickness of between 0.003 inch and 0.030 inches, the material being capable of being polished to a roughness of less than 6 micro inches Ra., the roll having uniformly spaced conduits equidistant from the center of the roll for passing heated fluid located at least within 2 inches of the circumferential surface, and the roll being capable of conducting at least 8,500 BTU/sq. ft./hr heat through the roll without creating tensile hoop stress in excess of ½ of the yield strength of the first material.

2. An internally heated calendering roll capable of finishing paper satisfactorily at the temperatures, heat loads and pressures required for substrata thermal molding, which roll comprises:
    A. a circumferential wall at least 4 inches thick;
    B. means to provide heat into the interior of the circumferential wall to be conducted through the wall to the outer surface for heating the paper web being calendered by the roll;
    C. the roll being constructed of a first material with a thin circumferential surface layer of a second, cermet or ceramic containing material;
    D. the surface layer material having a hardness of at least 530 Vickers and a thickness of between 0.003 inch and 0.030 inches and being capable of being polished to a roughness of less than 6 micro inches Ra;
    E. the roll having uniformly spaced conduits for passing heated fluid located no more than 2 inches from the outer edge of the conduits to the circumferential surface; and
    F. the roll being capable of conducting at least 8,500 BTU. Sq. Ft./Hr. heat through the roll without creating tensile hoop stress in excess of ½ of the yield strength of the first material.

3. The internally heated calender roll of claim 1, wherein the first material of the roll is selected from forged steel, cast steel, cast iron, or ductile iron.

4. The internally heated calendar roll of claim 1, wherein the first material of the roll is forged steel.

5. The internally heated calendar roll of claim 1, wherein the surface material is a carbide containing material.

6. The internally heated calender roll of claim 1, wherein the surface material is thermally sprayed upon the roll.

7. The internally heated calendar roll of claim 1, wherein the surface material is high velocity oxy-fuel thermally sprayed chrominum carbide and nickel and chromium.

8. Apparatus for calendaring paper comprising:
    A. the internally heated calendar roll of claim 1;
    B. a resilient pressure roll;
    C. means to press the resilient pressure roll and the metal calendaring roll against each other to form a nip with a nip load of at least 1000 pounds per lineal inch of calendar width; and
    D. means to continuously pass a web of paper through the nip.

9. The apparatus for calendering paper of claim 8, wherein the uniformly spaced conduits for passing heated fluid through the calendering roll are from 0.5 to 2 inches in diameter, and are positioned in accordance with the following formula: (hole diameter + hole spacing)/(2 × hole depth) is less than 1.2, where hole spacing is the distance from outer edge of one hole to the closest outer edge of the adjacent hole and hole depth is the distance from the outer edge of the hole to the surface of the roll; and the thermal conductivity of the heated calendering roll from the conduits to the surface is greater than 17 BTU/Hr.Ft.

10. The apparatus for calendering paper of claim 8, further comprising a polishing doctor blade positioned against the circumferential surface of the metal calendaring roll to resurface the roll while in operation faster than it deteriorates, the polishing doctor having a working surface containing an abrasive material harder than the surface material.

11. The apparatus for calendaring paper of claim 10, wherein the abrasive material in the working surface of the polishing doctor blade comprises diamond abrasive particles.

12. The apparatus for calendaring paper of claim 10, wherein the abrasive material in the working surface of the polishing doctor blade comprises diamond abrasive particles of a size between 2 and 12 microns in a hardened epoxy matrix wherein the diamond abrasive particles comprise between 1% and 5% of the working surface composition.

13. The apparatus for calendaring paper of claim 12, wherein the working surface of the polishing doctor blade further comprises hollow glass microspheres and polytetrafluoroethylene powder.

* * * * *

UNITED STATES PATENT AND TRADEMARK OFFICE
CERTIFICATE OF CORRECTION

PATENT NO. : 5,171,404
DATED : December 15, 1992
INVENTOR(S) : Eric R. Ellis, et al.

It is certified that error appears in the above-identified patent and that said Letters Patent is hereby corrected as shown below:

```
Column 2, line 22, change "om" to read --on--.
Column 8, line 11, change "claim 1" to read --claim 2--.
Column 8, line 14, change "claim 1" to read --claim 2--.
Column 8, line 16, change "claim 1" to read --claim 2--.
Column 8, line 19, change "claim 1" to read --claim 2--.
Column 8, line 22, change "claim 1" to read --claim 2--.
Column 8, line 24, change "chrominum" to read --chromium--.
Column 8, line 27, change "claim 1" to read --claim 2--.
```

Signed and Sealed this

Fifth Day of July, 1994

Attest:

BRUCE LEHMAN

*Attesting Officer*  *Commissioner of Patents and Trademarks*